(12) United States Patent
Teli et al.

(10) Patent No.: US 8,596,119 B2
(45) Date of Patent: Dec. 3, 2013

(54) BUOYANCY FORCE-BASED LIQUID LEVEL MEASUREMENT

(75) Inventors: Basavaraja M. Teli, Karnataka (IN); Saravanan Sadasivan, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 345 days.

(21) Appl. No.: 13/024,900

(22) Filed: Feb. 10, 2011

(65) Prior Publication Data

US 2012/0204636 A1 Aug. 16, 2012

(51) Int. Cl.
*G01F 23/30* (2006.01)
(52) U.S. Cl.
USPC .......................................................... 73/309
(58) Field of Classification Search
USPC .................... 73/309, 319, 305, 306, 307, 308
See application file for complete search history.

(56) References Cited

U.S. PATENT DOCUMENTS

| 2003/0010118 A1 | 1/2003 | Heldberg ........................ 73/309 |
| 2003/0192599 A1 | 10/2003 | Aoyama .................. 137/565.16 |
| 2010/0230768 A1* | 9/2010 | Legat et al. ................... 257/419 |

FOREIGN PATENT DOCUMENTS

| JP | 62046337 U | 3/1987 |
| JP | 2000046626 A * | 2/2000 |

OTHER PUBLICATIONS

EP Examination Report for EP 12 154 358.1, dated Nov. 9, 2012.
EP Search Report for EP 12 154 358.1, dated Jun. 14, 2012.
Anonymous; Full Range Liquid Level Sensor, Research Disclosure, Mason Publications, Hampshire, GB, No. 323, Mar. 1, 1991, p. 180.

* cited by examiner

*Primary Examiner* — Peter J Macchiarolo
*Assistant Examiner* — Tamiko Bellamy
(74) *Attorney, Agent, or Firm* — Ingrassia Fisher & Lorenz, P.C.

(57) ABSTRACT

Methods and apparatus are provided for measuring the liquid level within a reservoir based on the buoyancy force that the liquid imparts to a float member. a float member is at least partially submerged into a liquid in a reservoir. The float member is configured, upon being at least partially submerged into the liquid to a depth, to have a buoyancy force exerted thereon by the liquid that is proportional to the depth. The buoyancy force is transferred from the float member to a sensor, via a force transfer mechanism that is movable relative to the float member and the sensor.

10 Claims, 3 Drawing Sheets

BUOYANCY FORCE-BASED LIQUID LEVEL MEASUREMENT

TECHNICAL FIELD

This disclosure generally relates to liquid level sensors, and more particularly relates to a liquid level sensor and method based on buoyancy force measurement.

BACKGROUND

Many vehicles, such as automobiles, boats, trains, buses, and aircraft, include various reservoirs, as do many stationary facilities. The reservoirs contain various liquids, such as fuel, fresh water, sewage and other liquids. The level of liquid in these reservoirs may be monitored to, for example, prevent the reservoir from running empty, from running over, or to determine a need for service.

Numerous and varied types of liquid level measurement devices have been developed, and have been implemented with varying degrees of success. The measurement devices that have been developed span the technological gamut, from the relatively low-technology devices to relatively high-technology devices. In many instances, however, the presently known liquid level measurement devices are dependent on, and thus vary with, liquid density.

Hence, there is a need for a device and method for measuring liquid level in a reservoir that can be readily calibrated for different liquid densities. There is also a need for a device and method for measuring corrosive liquid levels. The present disclosure addresses at least these needs.

BRIEF SUMMARY

In one embodiment, a liquid level measurement device includes a sensor, a force transfer mechanism, and a float member. The sensor is adapted to receive a force and is configured, upon receipt of the force, to generate a sensor output signal representative of a level of liquid in a reservoir. The force transfer mechanism is disposed adjacent, and movable relative to, the sensor. The force transfer mechanism is configured to receive a buoyancy force and, upon receipt thereof, to transfer the buoyancy force to the sensor. The float member is movable relative to the sensor, and has a first end and second end. The first end is disposed adjacent the force transfer mechanism. The float member is configured, upon the second end being submerged into the liquid to a depth, to have a buoyancy force exerted thereon by the liquid that has a magnitude proportional to the depth. The float member is further configured to supply the buoyancy force to the force transfer mechanism.

In another embodiment, a liquid level measurement device includes a force sensor, a spherical force transfer mechanism, and a hollow, cylindrical float member. The force sensor is adapted to receive a force and is configured, upon receipt of the force, to generate a sensor output signal representative of a level of liquid in a reservoir. The spherical force transfer mechanism is disposed adjacent, and movable relative to, the sensor. The spherical force transfer mechanism is configured to receive a buoyancy force and, upon receipt thereof, to transfer the buoyancy force to the sensor. The hollow, cylindrical float member is movable relative to the sensor, and a first end and second end. The first end is disposed adjacent the spherical force transfer mechanism. The cylindrical float member is configured, upon the second end being submerged into the liquid to a depth, to a have buoyancy force exerted thereon by the liquid that has a magnitude proportional to the depth. The cylindrical float member is further configured to supply the buoyancy force to the spherical force transfer mechanism.

In still another embodiment, a method of measuring a level of liquid includes at least partially submerging a float member into a liquid in a reservoir. The float member is configured, upon being at least partially submerged into the liquid to a depth, to have a buoyancy force exerted thereon by the liquid that is proportional to the depth. The buoyancy force is transferred from the float member to a sensor, via a force transfer mechanism that is movable relative to the float member and the sensor. The sensor is configured to generate a signal, upon transfer of the buoyancy force thereto, that is representative of the level of the liquid in the reservoir.

Furthermore, other desirable features and characteristics of the liquid level measurement device and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
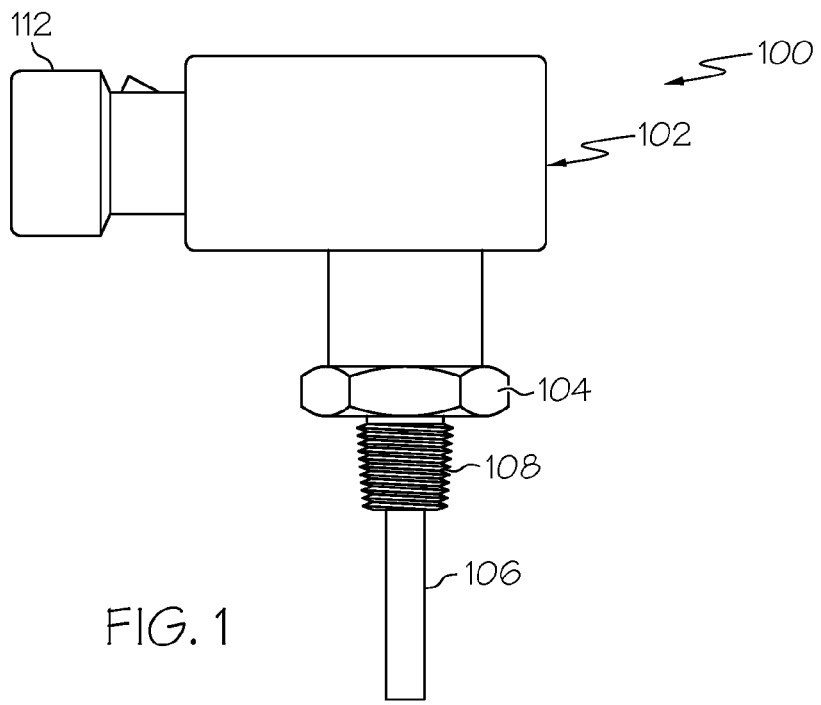
FIGS. 1-3 depict side, end, and bottom views, respectively, of a liquid level sensor according to an embodiment.
Figure 2:
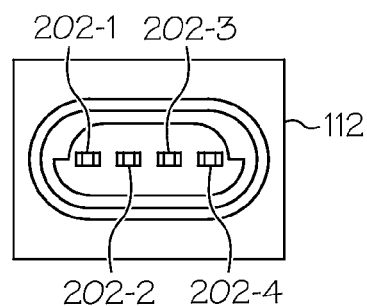
Figure 3:
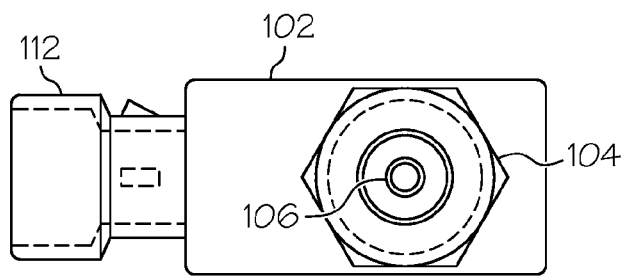

Referring first to FIGS. 1-3, side, end, and bottom views, respectively, of a liquid level sensor assembly 100 according to an embodiment are depicted. The sensor assembly 100 includes a housing assembly 102, which houses a non-illustrated sensor and various other non-illustrated components therein. A float member guide 104 and a float member 106 are each partially disposed within, and extend from, the housing assembly 102. The depicted float member guide 104 includes threads 108, which preferably mate with like threads on a non-illustrated reservoir that contains the liquid whose level is being measured. The float member 106, the purpose of which will be described more fully below, extends from the float member guide 104 and, when the sensor assembly 100 is mounted on a reservoir, is at least partially submerged into the liquid contained therein.

The housing assembly 102 is configured to include a connector section 112. The connector section 112, as shown more clearly in FIG. 2, includes a plurality of interconnection terminals 202 (e.g., 202-1, 202-2, 202-3, 202-4). The interconnection terminals 202 extend into the housing assembly 102, and allow the sensor assembly 100 to be electrically interconnected to one or more external, non-illustrated systems. Although the depicted housing assembly 102 includes four interconnection terminals 202, it will be appreciated that the housing assembly 102 could be implemented with more or less than this number of interconnection terminals 202.

Figure 4:
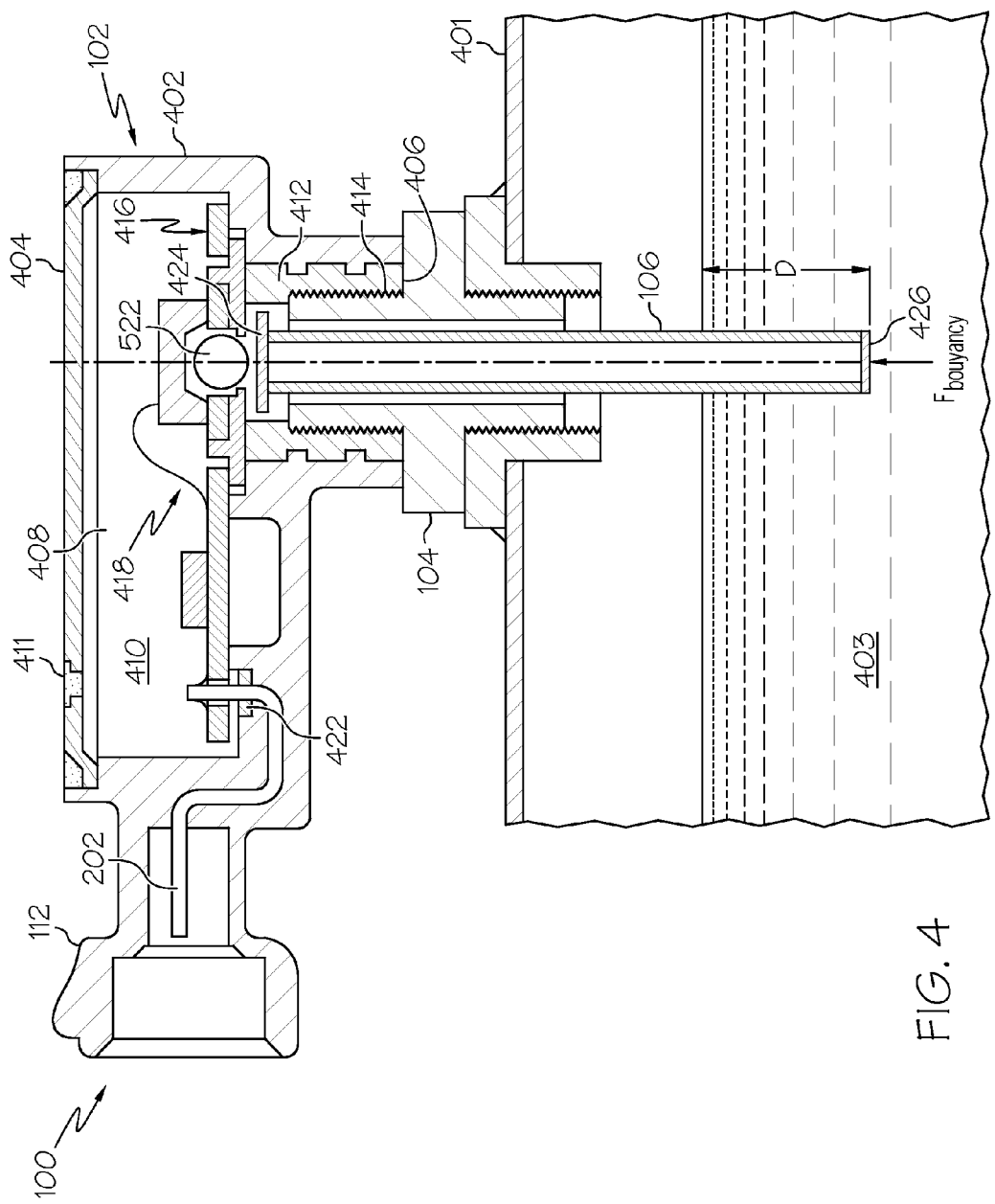
FIG. 4 depicts a cross section view of the exemplary liquid level sensor assembly depicted in FIG. 1 and partially immersed in a liquid.

Referring now to FIG. 4, a cross section view of the sensor assembly 100 coupled to a reservoir 401 that has a liquid 403 disposed therein is depicted. It may be seen that the depicted housing assembly 102 includes a sensor housing 402 and a cover 404. The sensor housing 402 may be variously implemented, but in the depicted embodiment it is implemented as an insert molded housing that has the connector section 112 integrally molded therewith. The sensor housing 402 includes bottom opening 406, a top opening 408, and a cavity 410. In the depicted embodiment, a threaded insert 412 is disposed within the bottom opening 406, and interfaces with like threads 414 on one end of the float member guide 104. In some embodiments, the sensor housing 402 may be integrally formed with suitable threads to interface with the float member guide 104, thereby alleviating the need for the threaded insert 412.

A circuit board assembly 416 and a sensor 418 are disposed within the cavity 410, via the top opening 408, and are mounted to the sensor housing 402. The sensor housing 402 is configured with suitable locating features, such as crush ribs, to facilitate mounting of the circuit board assembly 416. The circuit board assembly 416 may be adhesively coupled to the housing assembly 102, and is further connected, via suitable soldering techniques, to the interconnection terminals 202. As FIG. 4 further depicts, a suitable sealant 422 may be applied to enhance the sealing of the interconnection terminals 202.

The sensor housing 402 is also configured with suitable locating features to facilitate mounting of the cover 404. After the circuit board assembly 416 is mounted and all connections are made, the cover 404 may be placed over the top opening 408 and adhesively coupled to the sensor housing 402. After the cover 404 is adhered, the housing assembly 102 may undergo a curing process to cure the adhesive. Thus, the cover 404, at least in the depicted embodiment, includes one or more breather holes 411. The breather hole(s) 411 allows gases that may evolve during the curing process to escape from the cavity 410. Thereafter, the breather hole(s) 411 may be filled, and then the housing assembly 102 UV cured.

Figure 5:
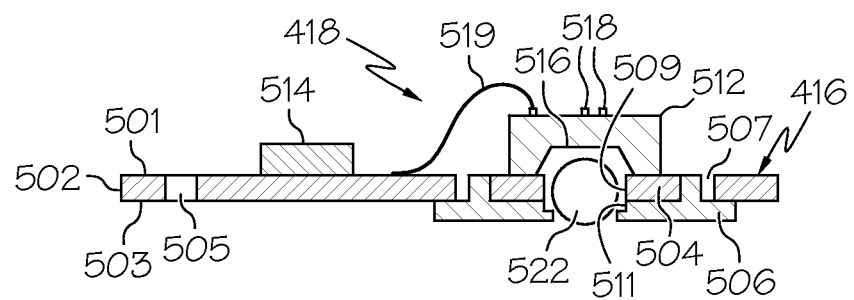
FIG. 5 depicts a close-up cross section view of a portion of the exemplary liquid level sensor assembly depicted in FIG. 1.
Figure 6:
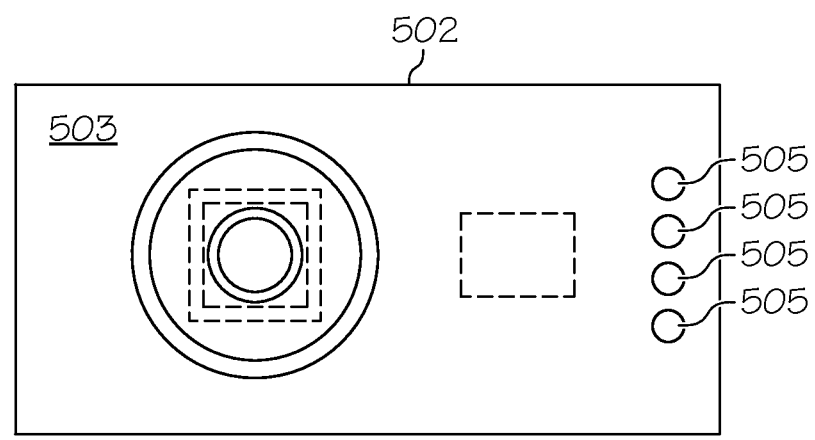
FIG. 6 depicts a bottom view of a PCB assembly that may be used to implement the sensor.

Referring now to FIGS. 5 and 6, although the circuit board assembly 416 may be variously configured and implemented, in the depicted embodiment it includes a circuit board 502, an insert 504, and an insert carrier 506. The circuit board 502 may be implemented using any one of numerous known printed circuit boards (PCBs), now known or developed in the future, for mounting and electrically interconnecting various circuit components. The circuit board 502 has a first surface 501, a second surface 503, a plurality of interconnection openings 505 and a sensor opening 507 that extend between the first and second surfaces 501, 503. With quick reference back to FIG. 4, it is seen that the interconnection terminals 202 extend, one each, through the interconnection openings 505 (only one shown in FIG. 4).

Returning to FIGS. 5 and 6, it is seen that the insert 504, which may be formed of a metal or ceramic, has an opening 509 that extends through it, and is coupled to the insert carrier 506 via suitable solder or adhesive. The insert carrier 506, which may also be formed of a metal or ceramic, has an opening 511 that extends through it, and is coupled to the second surface 503 of circuit board 502 via suitable solder or adhesive. A portion of the insert carrier 506, and thus the insert 504, extend into the sensor opening 507 in the circuit board 502. The insert 504 and insert carrier 506 may both be formed of a suitable metal or ceramic to inhibit, or at least substantially minimize, coefficient of thermal expansion mismatches with the sensor 418.

The sensor 418 is adapted to receive a force and is configured, upon receipt of the force, to generate a sensor output signal representative of the level of liquid 403 in the reservoir 401 (see FIG. 4). The sensor 418 may be variously configured and implemented to provide this functionality, but in the depicted embodiment it includes a sensor die 512 and a signal processing circuit 514. The sensor die 512 may be variously configured and implemented. In the depicted embodiment, however, it is implemented using a conventional force sensor that has a diaphragm 516 formed therein and a plurality of piezoresistive elements 518 formed thereon. With this configuration, when a force supplied to the diaphragm 516, the piezoresistive elements 518 generate what is referred to herein as a sensor die output signal that is representative of the supplied force. No matter the specific implementation, the sensor die 512 is mounted on and is coupled to the insert 504 via suitable solder or adhesive, and is electrically coupled to the circuit board assembly 416 via, for example, suitable wire bonds 519.

The signal processing circuit 514 is mounted on and is coupled to the circuit board assembly 416, and is electrically coupled to the sensor die 512 via non-illustrated circuit traces on the circuit board assembly 416 and via the wire bonds 519. The signal processing circuit 514, which may be variously configured and implemented, is, at least in the depicted embodiment, implemented using and application specific integrated circuit (ASIC). No matter its specific implementation, the signal processing circuit 514 is coupled to receive the sensor die output signal from the sensor die 512 and is configured, upon receipt thereof, to generate the sensor output signal representative of the level of liquid 403 in the reservoir 401.

As FIG. 5 also depicts, a force transfer mechanism 522 is disposed adjacent the sensor die 512, and is movable relative to the sensor die 512, the insert 504, and the insert carrier 506. The force transfer mechanism 522 is disposed between the sensor die 512 and the opening 511 in the insert carrier 506. The force transfer mechanism 522 is, more specifically, encapsulated between the sensor die 512 and the insert carrier 506, and extends partially through the opening 511 in the insert carrier 506. The force transfer mechanism 522 may be variously configured and implemented, but in the depicted embodiment it is a spherical body that is comprised of a suitable metal, such as stainless steel. It will be appreciated that, for clarity and ease of illustration, a visible gap is depicted in FIG. 5 between the sensor die 512 and the force transfer mechanism 522. However, in most embodiments there may be little if any gap between these components when assembled. It will additionally be appreciated that any one of numerous other shapes and materials could be used. No matter its configuration and implementation, the force transfer mechanism 522, as will now be described, is configured to receive a buoyancy force from the float member 106 and, upon receipt thereof, to transfer the buoyancy force to the sensor 418.

Returning once again to FIG. 4, the float member 106 is seen to extend from the housing assembly 102, via the bottom opening 406 and float member guide 104, into the reservoir 401. The float member 106 also extends into the liquid 403 to a depth (D). As may be appreciated, the depth (D) to which the float member 106 extends into the liquid 403 will depend upon the level of the liquid 403 in the reservoir 401. The float member 106 may be variously configured and implemented, but in the depicted embodiment it is implemented as a hollow, cylindrical body having a first end 424 and a second end 426. The first end 424 is disposed adjacent the force transfer mechanism 522, and the second end 426 is disposed in the liquid 403. When the second end 426 of the float member 106 is submerged into the liquid 403 to a depth (D), a buoyancy force ($F_{buoyancy}$) is exerted thereon by the liquid 403. The float member 106 supplies the buoyancy force to the force transfer mechanism 522. As noted above, the force transfer mechanism 522 in turn transfers the buoyancy force to the sensor 418. As will now be explained, the magnitude of buoyancy force exerted on the float member 106 is proportional to the depth (D).

As is generally known, fluid pressure increases with increasing depth below the surface of a liquid. Any object submerged to a depth below the surface of a liquid will experience different fluid pressures on its top and bottom, with the pressure on its bottom being higher than on its top. This difference in pressure causes the upward buoyancy force ($F_{buoyancy}$). The hydrostatic pressure (P) at a depth (D) in a fluid is the pressure exerted by the fluid due to its weight, and may be expressed as follows:

$$P = \rho g D \quad \text{(Eq. 1)}$$

where $\rho$ is the density of the fluid, g is standard gravitational force (−9.8 N/kg), and D is the depth.

The force, then, is simply the pressure (P) times the area of the surface. If the object is a cube, for example, then the pressure on the top surface is:

$$F_{top} = l^2 \rho D_{top} g \quad \text{(Eq. 2)}$$

where l is the length of each side of the cube. The buoyancy force ($F_{buoyancy}$) is then the difference between the forces at the top and bottom: is then the $$F_{buoyancy} = l^2 \rho g (D_{top} - D_{bottom}) \quad \text{(Eq. 3)}$$

In the case of a cube, the quantity ($D_{top} - D_{bottom}$) is −1, so equation (3) reduces to:

$$F_{buoyancy} = l^3 \quad \text{(Eq. 4)}$$

or:

$$F_{buoyancy} = -\rho V g \quad \text{(Eq. 5)}$$

where V is the volume of the cube, and the negative sign implies that it is in the opposite direction to gravity.

It can be demonstrated mathematically that this formula holds true for a submerged object of any shape, not just a cube. The buoyancy force on an object depends, therefore, only on two factors—the object's submerged volume, and the density of the surrounding fluid. The greater the object's volume and surrounding fluid density, the greater will be the buoyant force the submerged object experiences. Thus, the magnitude of the buoyant force is simply equal to the weight of the displaced fluid. In this context, displacement is the term used for the weight of the displaced fluid and, thus, is an equivalent term to buoyancy. The total force on the object is thus the net force of buoyancy and the object's weight.

As explained above, an object that is wholly or partially immersed in a fluid is buoyed up by a force ($F_{buoyancy}$) equal to the weight of the fluid displaced by the object. This may be stated mathematically as:

$$F_{buoyancy} = \rho g V \quad \text{(Eq. 7)}$$

where $\rho$ is fluid density, g is gravitational force, and V is the volume of the object that is immersed in the fluid.

As noted above, in the embodiment depicted in FIGS. 1 and 4 the float member 106 comprises a hollow, cylindrical body that, when it is immersed in the liquid 403, has a buoyancy force exerted thereon. This buoyancy force ($F_{buoyancy}$) is directly proportional to the immersed depth (D) of the float member, as follows.

$$F_{buoyancy} = \rho g \pi R^2 D \quad \text{(Eq. 8)}$$

Here, because $\pi R^2$ is constant, $\rho$ is known, and g is known, the buoyancy force ($F_{buoyancy}$) is proportional to the depth (D). It should be noted, however, that because the float member 106 is partially immersed in the liquid 403, the buoyancy force exerted on the float member 106 can be made independent of the density of the liquid 403, by having different float members 106 for correspondingly different fluid densities. Thus ensuring the buoyancy force is proportional only to the immersed depth. The same can also be achieved via a single float member 106 that is designed for different fluid densities. In this case, the force sensor 418 output can be calibrated to readout the level of the fluid independent of its density.

The liquid level measurement device and method described herein provides a device package that is compatible with, and thus allows level measurement of, numerous liquids inside a reservoir. The device can be used to measure numerous liquid levels by selecting a suitable length for the float member. The device is configured to provide corrosion resistance and isolation from external stresses and media, it is relatively accurate, relatively compact in size, and of relatively low complexity.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A liquid level measurement device, comprising:
   a sensor adapted to receive a force and configured, upon receipt of the force, to generate a sensor output signal representative of a level of liquid in a reservoir;
   a force transfer mechanism disposed adjacent, and movable relative to, the sensor, the force transfer mechanism configured to receive a buoyancy force and, upon receipt thereof, to transfer the buoyancy force to the sensor;
   a float member movable relative to the sensor, the float member having a first end and second end, the first end disposed adjacent the force transfer mechanism, the float member configured, upon the second end being submerged into the liquid to a depth, to have a buoyancy force exerted thereon by the liquid, the buoyancy force having a magnitude proportional to the depth, the float member further configured to supply the buoyancy force to the force transfer mechanism;
   a sensor die configured, upon receipt of the force, to generate a sensor die output signal;

a signal processing circuit coupled to receive the sensor die output signal and configured, upon receipt thereof, to supply the sensor output signal representative of the level of liquid in the reservoir;

a circuit board on which the signal processing circuit is mounted;

an insert carrier coupled to the circuit board; and an insert coupled to the insert carrier and on which the sensor die is mounted, wherein the insert carrier and insert comprise materials having at least substantially equivalent coefficients of thermal expansion (CTE).

2. The device of claim 1, wherein the float member comprises a hollow, cylindrical body.

3. The device of claim 1, wherein the force transfer mechanism comprises a spherical body.

4. The device of claim 1, wherein the sensor comprises a force sensor.

5. The device of claim 4, wherein the force sensor comprises:
a semiconductor sensor die having a diaphragm formed therein, the diaphragm configured to receive the force; and
one or more piezoresistive elements formed on the diaphragm and configured to generate a signal representative of the force received by the diaphragm.

6. The device of claim 1, wherein the signal processing circuit comprises an application specific integrated circuit (ASIC).

7. The device of claim 1, further comprising:
a housing coupled to, and at least partially enclosing, the sensor and the force transfer mechanism; and
a float member guide coupled to, and extending from, the housing and surrounding a portion of the float member.

8. A liquid level measurement device, comprising:
a force sensor adapted to receive a force and configured, upon receipt of the force, to generate a sensor output signal representative of a level of liquid in a reservoir;
a spherical force transfer mechanism disposed adjacent, and movable relative to, the sensor, the spherical force transfer mechanism configured to receive a buoyancy force and, upon receipt thereof, to transfer the buoyancy force to the sensor; and
a hollow, cylindrical float member movable relative to the sensor, the cylindrical float member having a first end and second end, the first end disposed adjacent the spherical force transfer mechanism, the cylindrical float member configured, upon the second end being submerged into the liquid to a depth, to a have buoyancy force exerted thereon by the liquid, the buoyancy force having a magnitude proportional to the depth, the cylindrical float member further configured to supply the buoyancy force to the spherical force transfer mechanism;
a sensor die configured, upon receipt of the force, to generate a sensor die output signal;
a signal processing circuit coupled to receive the sensor die output signal and configured, upon receipt thereof, to supply the sensor output signal representative of the level of liquid in the reservoirs circuit board on which the signal processing circuit is mounted;
an insert carrier coupled to the circuit board; and
an insert coupled to the insert carrier and on which the sensor die is mounted,
wherein the insert carrier and insert comprise materials having at least substantially equivalent coefficients of thermal expansion (CTE).

9. The device of claim 8, wherein the signal processing circuit comprises an application specific integrated circuit (ASIC).

10. The device of claim 8, further comprising:
a housing coupled to, and at least partially enclosing, the sensor and the force transfer mechanism; and
a float member guide coupled to, and extending from, the housing and surrounding a portion of the float member.

* * * * *